United States Patent
Kummamuru et al.

(10) Patent No.: US 7,502,765 B2
(45) Date of Patent: Mar. 10, 2009

(54) METHOD FOR ORGANIZING SEMI-STRUCTURED DATA INTO A TAXONOMY, BASED ON TAG-SEPARATED CLUSTERING

(75) Inventors: Krishna Kummamuru, Hyderabad (IN); Pankaj Kankar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/314,596

(22) Filed: Dec. 21, 2005

(65) Prior Publication Data

US 2007/0143235 A1   Jun. 21, 2007

(51) Int. Cl.
*G06E 1/00* (2006.01)
(52) U.S. Cl. ...................................... 706/15
(58) Field of Classification Search ............... 706/20, 706/15; 703/14, 19
See application file for complete search history.

(56) References Cited

U.S. PATENT DOCUMENTS

| | | | |
|---|---|---|---|
| 5,625,767 A | | 4/1997 | Bartell et al. |
| 5,835,087 A | * | 11/1998 | Herz et al. ................. 715/810 |
| 6,233,575 B1 | | 5/2001 | Agrawal et al. |
| 6,449,620 B1 | | 9/2002 | Draper et al. |
| 6,507,846 B1 | | 1/2003 | Consens |
| 6,556,983 B1 | * | 4/2003 | Altschuler et al. ............ 706/55 |
| 6,581,062 B1 | | 6/2003 | Draper et al. |
| 6,606,620 B1 | | 8/2003 | Sundaresan et al. |
| 6,718,367 B1 | * | 4/2004 | Ayyadurai ................. 709/206 |
| 6,804,677 B2 | | 10/2004 | Shadmon et al. |
| 7,165,024 B2 | * | 1/2007 | Glover et al. ................. 704/9 |
| 2001/0044837 A1 | | 11/2001 | Talib et al. |

(Continued)

FOREIGN PATENT DOCUMENTS

WO   WO 00/77690 A1   12/2000

(Continued)

OTHER PUBLICATIONS

Kummamuru et al, "A Hierarchical Monthetic Document Clustering Algorithm for Summarization and Browsing Search Results". May 17-20, 2004. pp. 658-665. Proceedings of the 13th International Conference on the World Wide Web.*

(Continued)

*Primary Examiner*—David R Vincent
*Assistant Examiner*—Melissa Berman
(74) *Attorney, Agent, or Firm*—Gibb & Rahman, LLC

(57) ABSTRACT

A method organizes semi-structured data into a taxonomy, based on Tag-Separated (TS) clustering. The method comprises retrieving documents including the semi-structured data. The semi-structured data comprises structured data including structured data fields and tags, and unstructured data. The method selects a structured attribute type including any of a categorical attribute, a numerical attribute, and a tag associated with annotated text, and an unstructured attribute type including a text attribute. The method clusters the semi-structured data from the retrieved documents into a plurality of clusters based on the selected structured attribute type and the selected unstructured attribute type. For a categorical attribute, each category corresponds to a single cluster. For a numerical attribute, a clustering algorithm clusters numerical data projected onto a range of the numerical attribute. For an annotated text attribute, a monothetic clustering algorithm clusters annotated text data according to tags associated with a vocabulary for the annotated text data.

12 Claims, 3 Drawing Sheets

U.S. PATENT DOCUMENTS

| | | | |
|---|---|---|---|
| 2002/0120630 | A1 | 8/2002 | Christianson |
| 2004/0139059 | A1 | 7/2004 | Conroy |
| 2004/0230461 | A1 | 11/2004 | Talib et al. |
| 2004/0267718 | A1 | 12/2004 | Milligan et al. |
| 2005/0044487 | A1 | 2/2005 | Bellegarda et al. |

FOREIGN PATENT DOCUMENTS

| | | |
|---|---|---|
| WO | WO 03/052627 A1 | 6/2003 |

OTHER PUBLICATIONS

Mandhani et al., "A Matrix Density Based Algorithm to Hierarchically Co-Cluster Documents and Words". May 20-24, 2003. pp. 511-518.Proceedings of the 12th International Conference on the World Wide Web.*

Kummamuru et al. "A Hierarchical Monothetic Document Clustering Algorithm for Summarization and Browsing Search Results". May 17-20, 2004. pp. 658-665. Proceedings of the 13th International Conference on the World Wide Web.*

Mandhani et al. "A Matrix Density Based Algorithm to Hierarchically Co-Cluster Documents and Words." May 20-24, 2003. pp. 511-518. Proceedings of the 12th International Conference on the World Wide Web.*

Kummamuru et al;, "A Hierarchical Monothetic Document Clustering Algorithm for Summarization and Browsing Search Results". May 17-20, 2004. pp. 658-665.*

* cited by examiner

METHOD FOR ORGANIZING SEMI-STRUCTURED DATA INTO A TAXONOMY, BASED ON TAG-SEPARATED CLUSTERING

FIELD OF THE INVENTION

The present invention relates to the organization and/or summary of data and more particularly to the automatic organization of semi-structured data into concept hierarchies or taxonomies.

BACKGROUND

Electronic data resides in numerous different forms and formats. Data can be well structured, such as when stored in the form of tables in relational databases, or unstructured, such as when stored as plain text or emails. Much data is generally irregular and loosely defined and does not adhere to a strict schema or conform to a preset format. Semi-structured data contains both structured and unstructured components. Some examples of semi-structured data include:

Product catalogs: Catalogs typically have structured data fields such as price, make and feature specifications but also have some unstructured data such as a product description in the form of text.

Call-center records: Such records typically contain details of the customer, the call-taker, and descriptive text summarizing the call.

Content managers: Documents in a repository typically include meta-data such as the date of creation, the author, the originating department, etc., in addition to the actual content of the document which comprises unstructured data.

Publication databases: Databases such as PUBMED and DBLP contain various details of articles such as a date of publication, the names of the author/s and the journal/conference name in addition to a title and an abstract which comprise unstructured data.

A need exists to provide improved methods and systems for handling semi-structured data for a variety of reasons. One such reason is the explosive growth of information available on the World Wide Web (WWW), which is a high volume data source that cannot be constrained by a rigid schema. Another reason is the need for exchanging data between disparate systems and databases, which demands an extremely flexible format for representing the data. Yet another reason is the integration of several heterogeneous data sources, notwithstanding the individual data sources being highly structured.

Drivers of the growth of semi-structured data include:

The use of XML as a standard for information exchange over the Internet.

Advances in Natural Language Processing (NLP) and annotator tools have resulted in conversion of a substantial amount of unstructured data to semi-structured data.

Semantic web and annotations.

As the volume of semi-structured data is growing exponentially, it is becoming increasingly necessary to organize this data in a comprehensible and navigable manner. Exponential growth of text data and unstructured data posed similar problems.

Web directories such as YAHOO, GOOGLE and Dmoz have shown that a hierarchical arrangement of documents is very useful for browsing a document collection. The Dmoz directory was manually created by about 52 thousand editors. Manually generated directories, more comprehensible and accurate than automatically generated directories, are not always feasible and require much effort and time for maintenance in a dynamic world. Therefore, Automatic Taxonomy Generation (ATG) methods are useful for automatically arranging documents into hierarchies.

Summarizing of web search results is an important application of ATG. Internet searches typically return thousands of results and ranked lists returned by search engines do not handle users' browsing needs efficiently. Most users respond by viewing only a few results and may thus miss much relevant information. Moreover the criterion used to rank the search results may not reflect a user's need. Organizing the search results in concept hierarchies summarizes the results and helps users in browsing those search results. However, predefined hierarchies and categories may not be useful in organizing query results, whether the hierarchies are generated automatically or manually. Post-retrieval document clustering provides superior results when query results are clustered to generate concept hierarchies.

Clustering of documents is thus an important part of ATG. The nodes at each level of a hierarchy of documents can be viewed as a clustering of the documents. Monothetic clustering algorithms assign documents to a cluster based on a single feature, whereas polythetic clustering algorithms assign documents to clusters based on multiple features. Known document clustering algorithms include the so-called K-means algorithm and its variants, hierarchical agglomerative clustering (HAC) methods and, more recently, graph partitioning methods. For K-means algorithms, the best performing similarity measure between documents is the cosine measure between two document vectors. HAC algorithms start with singleton documents as clusters, and iteratively merge the two most similar clusters. They differ in their choice of similarity measure between clusters. Once clustered the next important step is to assign proper labels to the clusters to render them comprehensible.

Polythetic ATG algorithms such as K-Means and HAC and monothetic ATG algorithms such as CAARD, DSP and Discover have been applied to unstructured data to automatically generate taxonomies. The VIVISIMO Content Integrator provides federated search or meta-search capabilities to public and private organizations. A federated search capability enables users to perform multiple searches at the same time through as many diverse informational sources as needed, whether the sources comprise internal documents, intranets, partner extranets, web sources, subscription services and databases, syndicated news feeds, or intelligence portals such as HOOVERS. VIVISIMO also provides a product called Clustering Engine which automatically clusters or organizes search results into categories that are intelligently selected from the words and phrases contained in the results or documents themselves.

Some of the more commonly used techniques for analysis and summary of structured data are multidimensional navigation and OLAP. ENDECA search and guided navigation technology enables multidimensional navigation of search results, identifies important dimensions or attributes for a current set of results and groups the results into relevant categories along each dimension. However ENDECA does not rank the various dimensions or attributes nor cluster text or unstructured attributes.

Storage, indexing and searching of semi-structured data poses new challenges. U.S. Pat. No. 6,804,677, entitled "Encoding semi-structured data for efficient search and browsing", issued to Shadman et al. on Oct. 12, 2004 and is assigned to Ori Software Development Ltd. The patent relates to a method for encoding XML tree data that includes the step of encoding semi-structured data into strings of arbitrary length in a way that maintains non-structural and structural information about the XML data, and enables indexing the encoded XML data in a way facilitates efficient search and browsing.

Searching a large volume of semi-structured data such as the Internet returns a large set of data that is not simply browsed and navigated. Automatic organization of search results into concept hierarchies assists in browsing and navigating the search results. Such taxonomies advantageously also summarize the search results. U.S. Pat. No. 6,606,620, entitled "Method and system for classifying semi-structured documents", issued to Sundaresan et al. on Aug. 12, 2003 and is assigned to INTERNATIONAL BUSINESS MACHINES CORPORATION. The method and system disclosed in the patent requires predefined classes and training data for learning, which may be expensive and may not be exhaustive. Furthermore, as data in a repository is evolving, a need may arise to form new classes, which is not feasible if done manually.

Recent advancements in technology have made the storage, retrieval, search and handling of semi-structured data more feasible. However, predefined taxonomies are not of any real assistance for semi-structured data. Hence, for semi-structured data, a need exists for methods and systems that automatically discover or generate taxonomies.

SUMMARY

The invention includes a method for organizing semi-structured data into a taxonomy, based on Tag-Separated (TS) clustering. The method comprises retrieving documents including the semi-structured data. The semi-structured data comprises structured data including structured data fields and tags, and unstructured data. The method selects a structured attribute type including any of a categorical attribute, a numerical attribute, and a tag associated with annotated text, and an unstructured attribute type including a text attribute. The method clusters the semi-structured data from the retrieved documents into a plurality of clusters based on the selected structured attribute type and the selected unstructured attribute type.

For a categorical attribute, each category corresponds to a single cluster. For a numerical attribute, a clustering algorithm clusters numerical data projected onto a range of the numerical attribute. For an annotated text attribute, a monothetic clustering algorithm clusters annotated text data according to tags associated with a vocabulary for the annotated text data.

For text attribute, a monothetic clustering algorithm clusters text data with respect to the text attribute. The method ranks the plurality of clusters with respect to each selected structured and unstructured attribute type. Clusters of the plurality of clusters are ranked based on a criterion comprising coverage provided by a number of data points in a cluster. The method ranks the selected structured and unstructured attribute types relative to each other based on a ranking measure. The selected structured and unstructured attribute types are ranked based on entropy of corresponding data for each selected structured and unstructured attribute type. The method outputs documents, based on the ranking measure and the ranking the plurality of clusters, as the organizing, to a user.

BRIEF DESCRIPTION OF THE DRAWINGS

A small number of embodiments are described hereinafter, by way of example only, with reference to the accompanying drawings in which.

DETAILED DESCRIPTION

Embodiments of methods, systems and computer program products are described hereinafter for organizing semi-structured data into taxonomies. Use of the phrase 'semi-structured data' in this document is intended to mean data containing one of more of the following types of attributes: categorical, numerical, annotated text and text or unstructured.

Monothetic clustering algorithms identify a set of key concepts present in each of a collection of documents. For example, such concepts may comprise words that appear in the documents or phrases extracted from the documents by some form of natural language processing. Monothetic clustering of documents involves selecting subsets of such concepts, making the subsets the labels of clusters, and assigning documents containing a concept to the cluster having the concept as its label. Monothetic clustering algorithms can be used to generate taxonomies. To start with, a "Root" node is created containing all of a given set of documents. The clusters obtained by clustering the documents form the child nodes of the "Root" node. The process is recursively applied to each child node until a termination condition is reached to generate a hierarchy of nodes in which nodes at lower levels represent a more specific concept than nodes at a relatively higher level. For additional information in relation to monothetic clustering algorithms, the reader is referred to the text "*Algorithms for Clustering Data*", by Jain A. K. and Dubes R. C., Prentice Hall, Englewood Cliffs, N.J., 1989.

Two methods for clustering semi-structured data to generate taxonomies that use monothetic algorithms are described hereinafter. The first is referred to as Tag-Separated (TS) clustering and the second is referred to as Tag-Mixed (TM) clustering.

Tag-Separated (TS) Clustering

A method for organizing semi-structured data into a taxonomy is based on tag-separated (TS) clustering. This method comprises the three main steps of clustering the data using attributes, ranking the clusters, and ranking the attributes. The attributes are ordered based on their rank. Within each attribute, single level labeled clusters are generated using a suitable monothetic algorithm selected based on the type of the particular attribute. The clusters are themselves ranked. The process is repeated recursively for each cluster to generate a concept hierarchy.

Figure 1:
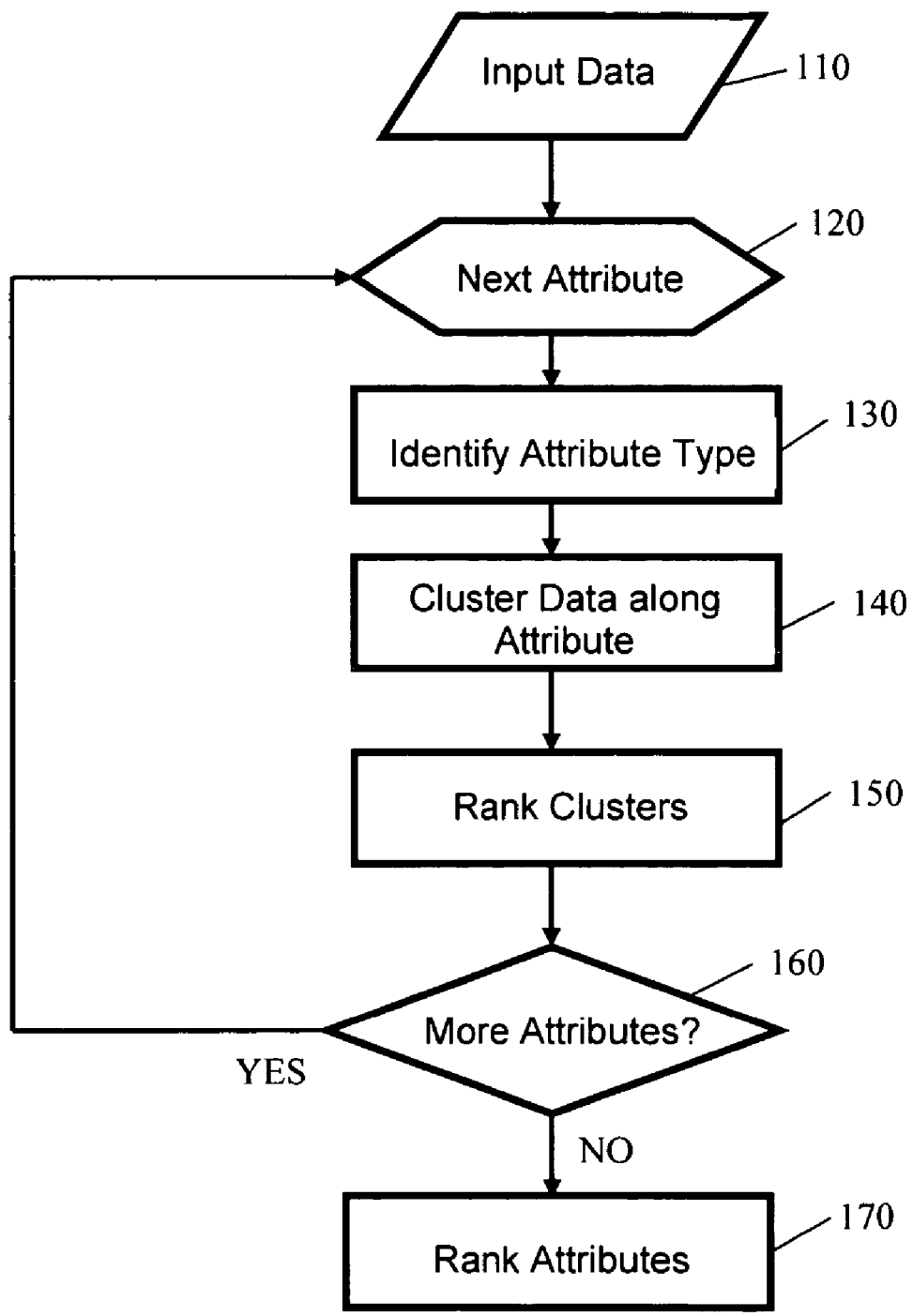
FIG. 1 is a flowchart of a method for organizing semi-structured data into a taxonomy based on tag-separated (TS) clustering.

FIG. 1 is a flowchart of a method for organizing, semi-structured data into a taxonomy based on tag-separated (TS) clustering.

At step 110, data comprising or consisting of semi-structured data is input.

At step 120, an attribute is selected. The attribute's type is identified at step 130. Typical examples of attribute types include categorical attributes, numerical attributes, text or unstructured attributes, and attributes with annotated text.

At step 140, the data is clustered based on the attribute selected in step 120. The actual clustering algorithm used depends on the type of the attribute selected:

For categorical attributes, each category constitutes a single cluster. The number of clusters is thus the same as the number of categories. The categories are ranked based on the coverage, that is, the number of data points having the attribute value equal to a category.

For numerical attributes, traditional clustering algorithms such as K-Means and HAC can be used to cluster the data projected onto the range of the numerical attribute. However, other algorithms such as algorithms based on valley detection and model selection and mode hunting algorithms in an EM framework may also be used.

Various monothetic document clustering algorithms such as CAARD, Discover and DSP can be used to cluster data with respect to text attributes. The CAARD clustering algorithm is briefly described hereinafter and the reader is referred to a paper by Krishna K. and Krishnapuram R., entitled "*A Clustering Algorithm for Asymmetrically Related Data with its Applications to Text Mining*", CIKM-2001, Atlanta, USA, November 2001, pp. 571-573, for additional information. For additional information in relation to the DSP clustering algorithm, the reader is referred to a paper by Lawrie D. J. and Croft W. B., entitled "*Generating hierarchical summaries for web searches*", in Proceedings of SIGIR, 2003, pp. 457-458. For additional information in relation to the Discover clustering algorithm, the reader is referred to a paper by Kummamuru K., Lotlikar R., Roy S., Singal K. and Krishnapuram R., entitled "*A Hierarchical Monothetic Document Clustering Algorithm for Summarization and Browsing Search Results*", in Proceedings of WWW, New York, USA, May 17-22, 2004. Each of the three foregoing papers relating to monothetic clustering algorithms is incorporated herein in their entirety by reference.

Annotated text attributes can be clustered using non-mixed tag clustering or mixed tag clustering.

In non-mixed tag clustering, a separate vocabulary is constructed using the text appearing with each tag. That is, there is a vocabulary corresponding to each tag appearing in the annotated text. Any monothetic clustering algorithm can generally be used to find clusters within each vocabulary. Once clusters are found, a data point is assigned to a cluster if the data point has the cluster label within the corresponding tag. This approach yields a hierarchy of clusters with two levels. The first level comprises various annotations/tags and the second level comprises clusters derived from corresponding tag-specific vocabulary. The clusters in the first level are ranked based on entropy of the distribution of data across clusters in the second level, which is explained hereinafter. In mixed tag clustering, a single vocabulary comprising tokens representing (tag, value) pairs is generated. Any monothetic clustering algorithm can generally be applied to generate the clusters using this single vocabulary.

At step 150, the clusters obtained with respect to each attribute are ranked for ordering. Various ranking criteria can be used and the ranking will depend on the type of attribute to which the clusters belong. Some examples of ranking criteria include coverage (the number of data points in the cluster), coverage along with distinctiveness and average intra-cluster distance. For additional information in relation to distinctiveness, the reader is referred to a paper by Kummamuru K., Lotlikar R., Roy S., Singal K. and Krishnapuram R., entitled "*A Hierarchical Monothetic Document Clustering Algorithm for Summarization and Browsing Search Results*", in Proceedings of WWW, New York, USA, May 17-22, 2004, as incorporated by reference hereinbefore. For the purpose of browsing search results, coverage is the most important criterion.

At step 160, a determination is made whether more attributes are to be processed. If so (YES), processing returns to step 120 for selection of the next attribute. If not (NO), processing continues at step 170.

At step 170, the attributes are ranked based on a common measure that is suitable for each of the different attributes. In one embodiment, entropy along an attribute is used as a measure to rank the attributes by:

Generating a cluster for each attribute using the method described in step 140.

Calculating the entropy of each attribute based on the cluster generated along that attribute (described hereinafter) and ranking the attributes to generate a summary.

The number of clusters used to calculate the entropy may be limited to the top few clusters. For example, the top few clusters may comprise the top few clusters in the ranked list of clusters (as per step 150). Alternatively top clusters may be selected to cover a pre-determined percentage of the data (e.g., the top ranked n clusters may be selected, where n takes a value such that 90% of the data is covered).

Computation of Attribute Entropy Based on Generated Clusters

Let $n_{ij}$ denote the number of data points in the jth cluster of ith attribute.

Let $N_i$ denote the number of clusters with respect to ith attribute.

Let $$p_{ij} = n_{ij} \bigg/ \sum_{l=1}^{N_i} n_{il}$$

where $p_{ij}$ is the probability that a data point belongs to jth cluster while clustering along the ith attribute.

Then, the entropy $E_i$ of the ith attribute is given by:

$$E_i = \sum_{j=1}^{N_i} p_{ij} \log(p_{ij})$$

As the attributes are of different types and different clustering algorithms may be used to cluster the data along the attributes, the entropy computed for an attribute will be dependent on the algorithm used and its parameters.

In an alternative embodiment also using entropy as a ranking measure, the entropy of the data along each attribute is calculated and the attributes are ranked based on this entropy. Then for each attribute in the ranked list, data is clustered along the attribute. This will shield against bias generated due to variations in clustering algorithm for different attributes and/or variations in parameters of the clustering algorithm.

Although the embodiments described employ entropy as a ranking criterion, any other ranking criterion which is suitable across different types of attributes can be used. Examples of other ranking criteria that may be used include cluster cohesiveness and the Pseudo F statistic. For additional information in relation to cluster cohesiveness, the reader is referred to the text "*Algorithms for Clustering Data*", Jain A. K. and Dubes R. C., Prentice Hall, Englewood Cliffs, N.J., 1989. For additional information in relation to the Pseudo F statistic, the reader is referred to "*A dendrite method for*

*cluster analysis*", Calinski T. and Harabasz J., Communications in Statistics, 3:1-27, 1974.

Tag-Mixed (TM) Clustering

Another method for organizing semi-structured data into taxonomy is based on tag-mixed (TM) clustering. This involves construction of a vocabulary of (attribute value) pairs and/or tuples based on the data. Numerical attributes are clustered and converted to categorical attributes before being added to the vocabulary. A categorical attribute with n possible categorical values results in n (attribute, value) pairs in the vocabulary. Textual attributes result in (attribute, word/phrase) pairs in the vocabulary, where the word/phrase appears as the value of the attribute. Annotated text attributes result in (attribute, tag, value) tuples in the vocabulary, where 'value' represents a word or phrase appearing in the tagged text. Thus the constructed vocabulary consists of (attribute, value) pairs and/or (attribute, tag, value) tuples, which are also referred to as tokens. Once the vocabulary has been constructed, a monothetic clustering algorithm (e.g., as referred to hereinbefore) can be used to generate a taxonomy of the data.

Figure 2:
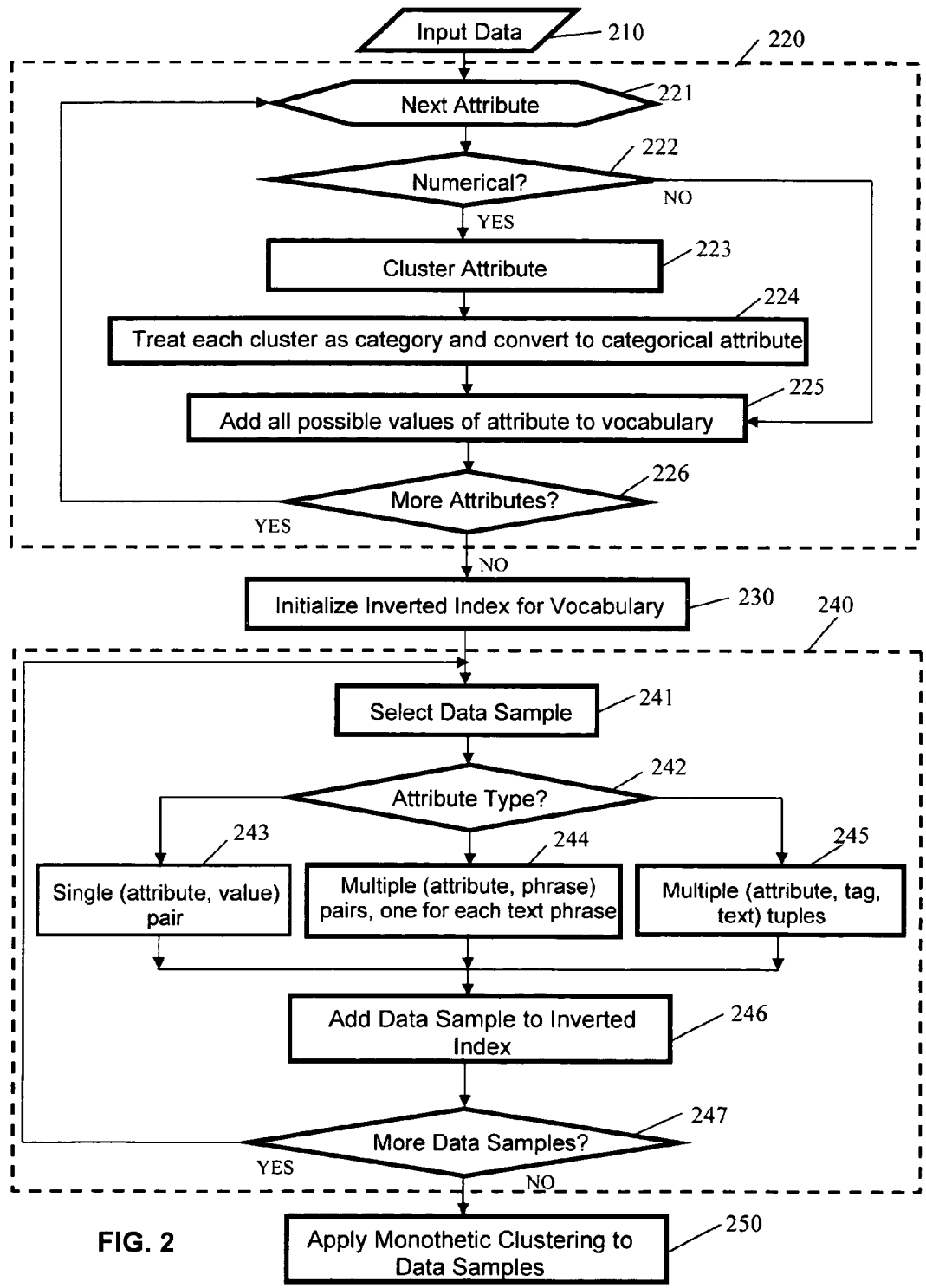
FIG. 2 is a flowchart of a method for organizing semi-structured data into a taxonomy based on tag-mixed (TM) clustering.

FIG. 2 is a flowchart of a method for organizing semi-structured data into a taxonomy based on tag-mixed (TM) clustering.

At step 210, data comprising or consisting of semi-structured data is input.

Step 220 comprises sub-steps 221 to 226 for constructing a vocabulary based on the data input in step 210. The different attribute types are considered or processed in substantially the same way except for numerical attributes. Numerical attributes are first clustered and each cluster is considered as a category. Numerical attributes are thus converted to categorical attributes.

At step 221, an attribute is selected. At step 222, a determination is made whether the selected attribute is numerical. If so (YES), the attribute is clustered at step 223. Then, at step 224, each cluster is treated as a category and the numerical attribute is converted to a categorical attribute. All possible values of the attribute are added to the vocabulary at step 225. If the selected attribute is non-numerical (NO), at step 222, processing proceeds directly to step 225 where all possible values of the attribute are added to the vocabulary.

After step 225, a determination is made at step 226 whether more attributes are to be processed. If so (YES), processing continues at step 222, where the next attribute is selected. If not (NO), processing continues at step 230.

The constructed vocabulary consists of (attribute, value) pairs and/or (attribute, tag, value) tuples, also known as tokens.

Each data sample is represented as a set of tokens where each token is contained in the data sample and is part of the vocabulary. An inverted index for a given data set and a vocabulary contains each token in the vocabulary with reference to all the data samples containing that token.

An inverted index for the vocabulary is initialized at step 230 and a representation of each data sample is created at step 240, which comprises sub-steps 241 to 245. A data sample is selected at step 241. At step 242, a determination is made as to the attribute type of the data sample selected at step 241. If the attribute type is categorical or numerical (step 243), there exists a single token or (attribute, value) pair. Alternatively, if the attribute type is text (step 244), multiple tokens or (attribute, phrase) pairs exist for each text phrase. Alternatively, if the attribute type is annotated text (step 245), multiple tokens or (attribute, tag, text) tuples exist. After each of steps 243, 244 and 245, the relevant representation of the data sample selected in step 241 is added to the inverted index at step 246.

At step 247, a determination is made whether any more data samples need to be processed. If so (Y), processing returns to step 241 for selection of the next data sample. If not (N), monothetic clustering is applied to the data samples using the data in the inverted index at step 250.

The CAARD Monothetic Clustering Algorithm

The CAARD monothetic clustering algorithm is briefly described hereinafter with reference to the tag-mixed method of FIG. 2:

1. Once the vocabulary has been determined (step 220 of FIG. 2), an inverse index is created containing a list of data samples that contain a given vocabulary item. Let $e_1, \ldots, e_n$ be the n entries in the vocabulary. Then, let $l_1, \ldots, l_n$ be the n corresponding sets of numbers that indicate the list of data items containing the corresponding vocabulary entry. That is, each $l_i$ indicates a list of all data items containing $e_i$.

2. The clustering algorithm computes inclusion of one entry into another. Inclusion of $e_i$ into $e_j$ is given by the formula $l_i \cap l_j / |l_j|$, where $|l_j|$ represents the number of elements in $l_j$.

3. The set of data clusters are represented by their representatives which are entries in the vocabulary.

4. A set of the representatives S is generated by considering the vocabulary entries in descending order of their frequency.

5. The first entry in the order is added to S. Then, each consecutive entry is added to one of the existing clusters $C_i$ if the entry is included into the corresponding representative $r_i$ in S by more than a defined threshold. If the data sample is not related to any of the existing entries in S by more than the threshold, the data sample is added to S. That is, a new cluster is formed with this entry as its representative.

6. Once the set of representatives S is generated, each data sample is assigned to a cluster if the cluster's representative is contained in the data sample. Hence, each data sample could belong to more than one cluster. If a data sample does not belong to any of the clusters, then the data sample is assigned to a 'miscellaneous' cluster.

A more detailed description of the CAARD clustering algorithm is available in a paper by Krishna K. and Krishnapuram R., entitled "*A Clustering Algorithm for Asymmetrically Related Data with its Applications to Text Mining*", CIKM-2001, Atlanta, USA, November 2001, pp. 571-573, which is incorporated herein in its entirety by reference.

However, it should be noted that other monothetic clustering algorithms such as DSP and Discover can be used in place of the CAARD algorithm. For additional information in relation to the DSP clustering algorithm, the reader is referred to a paper by Lawrie D. J. and Croft W. B., entitled "*Generating hierarchical summaries for web searches*", in Proceedings of SIGIR, 2003, pp. 457-458. For additional information in relation to the Discover clustering algorithm, the reader is referred to a paper by Kummamuru K., Lotlikar R., Roy S., Singal K. and Krishnapuram R., entitled "*A Hierarchical Monothetic Document Clustering Algorithm for Summarization and Browsing Search Results*", in Proceedings of WWW, New York, USA, May 17-22, 2004. Both of the foregoing papers relating to monothetic clustering algorithms are incorporated herein in their entirety by reference.

Example Taxonmies

Examples of taxonomies generated on a set of bibliographic entries are shown hereinafter.

Table 1 shows a sample of bibliographic entries in the DBLP database, which provides bibliographic information on major computer science journals and proceedings.

TABLE 1

```
<inproceedings mdate="2002-12-17" key="conf/kdd/AgrawalP95">
<author>Rakesh Agrawal</author> <author>Giuseppe Psaila</author>
<title>Active Data Mining.</title>
<pages>3-8</pages> <year>1995</year>
<booktitle>KDD</booktitle> <url>db/conf/kdd/kdd95.html#AgrawalP95</url>
</inproceedings>
<inproceedings mdate="2002-12-17" key="conf/kdd/AgrawalS96">
<author>Rakesh Agrawal</author> <author>Kyuseok Shim</author>
<title>Developing Tightly-Coupled Data Mining Applications on a Relational Database
System.</title>
<pages>287-290</pages> <year>1996</year>
<booktitle>KDD</booktitle> <url>db/conf/kdd/kdd96.html#AgrawalS96</url>
</inproceedings>
<inproceedings mdate="2004-03-31" key="conf/icde/AgrawalCDN03">
<author>Rakesh Agrawal</author> <author>Surajit Chaudhuri</author>
<author>Abhinandan Das</author> <author>Vivek R. Narasayya</author>
<title>Automating Layout of Relational Databases.</title>
<pages>607-618</pages> <year>2003</year>
<crossref>conf/icde/2003</crossref>
<booktitle>ICDE</booktitle> <url>db/conf/icde/icde2003.html#AgrawalCDN03</url>
</inproceedings>
<inproceedings mdate="2004-03-31" key="conf/icde/Agrawal03">
<author>Rakesh Agrawal</author>
<title>Database Technologies for E-Commerce.</title>
<pages>801</pages>
<ee>http://csdl.computer.org/comp/proceedings/icde/2003/2071/00/20710801abs.htm</ee>
<year>2003</year><crossref>conf/icde/2003</crossref>
<booktitle>ICDE</booktitle> <url>db/conf/icde/icde2003.html#Agrawal03</url>
</inproceedings>
```

Table 2 shows a portion of a taxonomy generated using the Tag-Separated (TS) method described hereinbefore with reference to FIG. 1 from a subset of the DBLP database, a sample extract of which is shown in Table 1. As may be seen from Table 2, the nodes at the first level represent the attributes such as 'AUTHOR' and 'BOOKTITLE' and the nodes at the second level represent the values of that attributes. For example nodes within the attribute node 'AUTHOR' represent the authors 'Ramakrishnan Srikant' and 'H. V. Jagdish'.

TABLE 2

```
<ROOT LABEL= "Rakesh Agrawal">
    <NODE LABEL = AUTHOR>
        <NODE LABEL = "Ramakrishnan Srikant" >
            <pub> <article mdate = 2003-11-20 key = journals/tkde/AgrawalS03 >
            <author>Rakesh Agrawal</author> <author>Ramakrishnan Srikant</author>
            <title>Searching with Numbers.</title>
            <pages>855-870</pages> <year>2003</year> <volume>15</volume>
            <journal>IEEE Trans. Knowl. Data Eng.</journal> <number>4</number>
            <ee>http://csdl.computer.org/comp/trans/tk/2003/04/k0855abs.htm</ee>
            <url>db/journals/tkde/tkde15.html AgrawalS03</url>
            </article> </pub>
        </NODE>
        <NODE LABEL = "H. V. Jagadish">
            <pub> <article mdate = 2003-11-28 key = journals/debu/AgrawalJ89 >
            <author>Rakesh Agrawal</author><author>H. V. Jagadish</author>
            <title>Multiprocessor Transitive Closure Algorithms.</title>
            <pages>30-36</pages> <year>1989</year> <volume>12</volume>
            <journal>IEEE Data Eng. Bull.</journal>
            <number>1</number>
            <url>db/journals/debu/debu12.html AgrawalJ89</url>
            </article> </pub>
        </NODE>
    </NODE>
    <NODE LABEL = BOOKTITLE>
        <NODE LABEL = "VLDB">
            <pub> <inproceedings mdate = 2002-01-03 key = conf/vldb/AgrawalJ87 >
            <crossref>conf/vldb/87</crossref>
            <author>Rakesh Agrawal</author> <author>H. V. Jagadish</author>
            <title>Direct Algorithms for Computing the Transitive Closure of Database
            Relations.</title>
            <pages>255-266</pages> <year>1987</year> <booktitle>VLDB</booktitle>
            <url>db/conf/vldb/vldb87.html AgrawalJ87</url>
            <cite>...</cite> <cite>conf/vldb/DeWittG85</cite> <cite>...</cite>
            </inproceedings> </pub>
```

TABLE 2-continued

```
        </NODE>
        <NODE LABEL = "ICDE">
            <pub> <inproceedings mdate = 2003-11-14 key = conf/icde/Agrawal03 >
            <author>Rakesh Agrawal</author>
            <title>Database Technologies for E-Commerce.</title>
            <pages>801</pages> <year>2003</year>
            <crossref>conf/icde/2003</crossref>
            <booktitle>ICDE</booktitle>
            <url>db/conf/icde/icde2003.html Agrawal03</url>
            </inproceedings> </pub>
        </NODE>
    </NODE:BOOKTITLE>
</ROOT>
```

Table 3 shows a portion of a taxonomy generated using the Tag-Mixed (TM) method described hereinbefore with reference to FIG. 2.

TABLE 3

```
<ROOT LABEL= "Rakesh Agrawal">
    <NODE TAG = AUTHOR; VALUE = "Ramakrishnan Srikant" >
        <pub> <article mdate = 2003-11-20 key = journals/tkde/AgrawalS03 >
        <author>Rakesh Agrawal</author> <author>Ramakrishnan Srikant</author>
        <title>Searching with Numbers.</title>
        <pages>855-870</pages> <year>2003</year> <volume>15</volume>
        <journal>IEEE Trans. Knowl. Data Eng.</journal> <number>4</number>
        <ee>http://csdl.computer.org/comp/trans/tk/2003/04/k0855abs.htm</ee>
        <url>db/journals/tkde/tkde15.html AgrawalS03</url>
        </article> </pub>
    </NODE >
    <NODE TAG = BOOKTITLE; VALUE = "VLDB">
        <pub> <inproceedings mdate = 2002-01-03 key = conf/vldb/AgrawalJ87 >
        <crossref>conf/vldb/87</crossref>
        <author>Rakesh Agrawal</author> <author>H. V. Jagadish</author>
        <title>Direct Algorithms for Computing the Transitive Closure of Database
        Relations.</title>
        <pages>255-266</pages> <year>1987</year> <booktitle>VLDB</booktitle>
        <url>db/conf/vldb/vldb87.html AgrawalJ87</url>
        <cite>...</cite> <cite>conf/vldb/DeWittG85</cite> <cite>...</cite>
        </inproceedings> </pub>
    </NODE>
</ROOT>
```

The vocabulary of the database shown in Table 3 comprises the following entries:

The numerical attribute <year> is clustered. Assuming that the years are clustered into decades, the values of the year attributes are mapped to the appropriate decade. The corresponding vocabulary would contain entries such as (year, 2000-10), (year, 1990-2000), and (year, 1980-90).

The attributes such as <author> and <booktitle> are categorical, which take one of a pre-specified number of values. The corresponding vocabulary entries would be (author, "Rakesh Agrawal"), (author, "Surajit Chaudhuri"), (booktitle, ICDM), (booktitle, ICML).

The attributes such as <title> are textual and the vocabulary corresponding to the <title> attribute contains entries such as (title, Automating), (title, Relational) and (title, Databases). If the <title> tag is annotated with proper nouns then a corresponding vocabulary entry would be (title, proper-noun, "Relational Databases").

The foregoing tables 2 and 3 constitute examples of bibliographic entries organized into taxonomies and are of an illustrative nature only. In particular, the methods described hereinbefore are applicable to any semi-structured data and are by no means limited to the type of data shown in the foregoing examples.

Computer Hardware and Software

Figure 3:
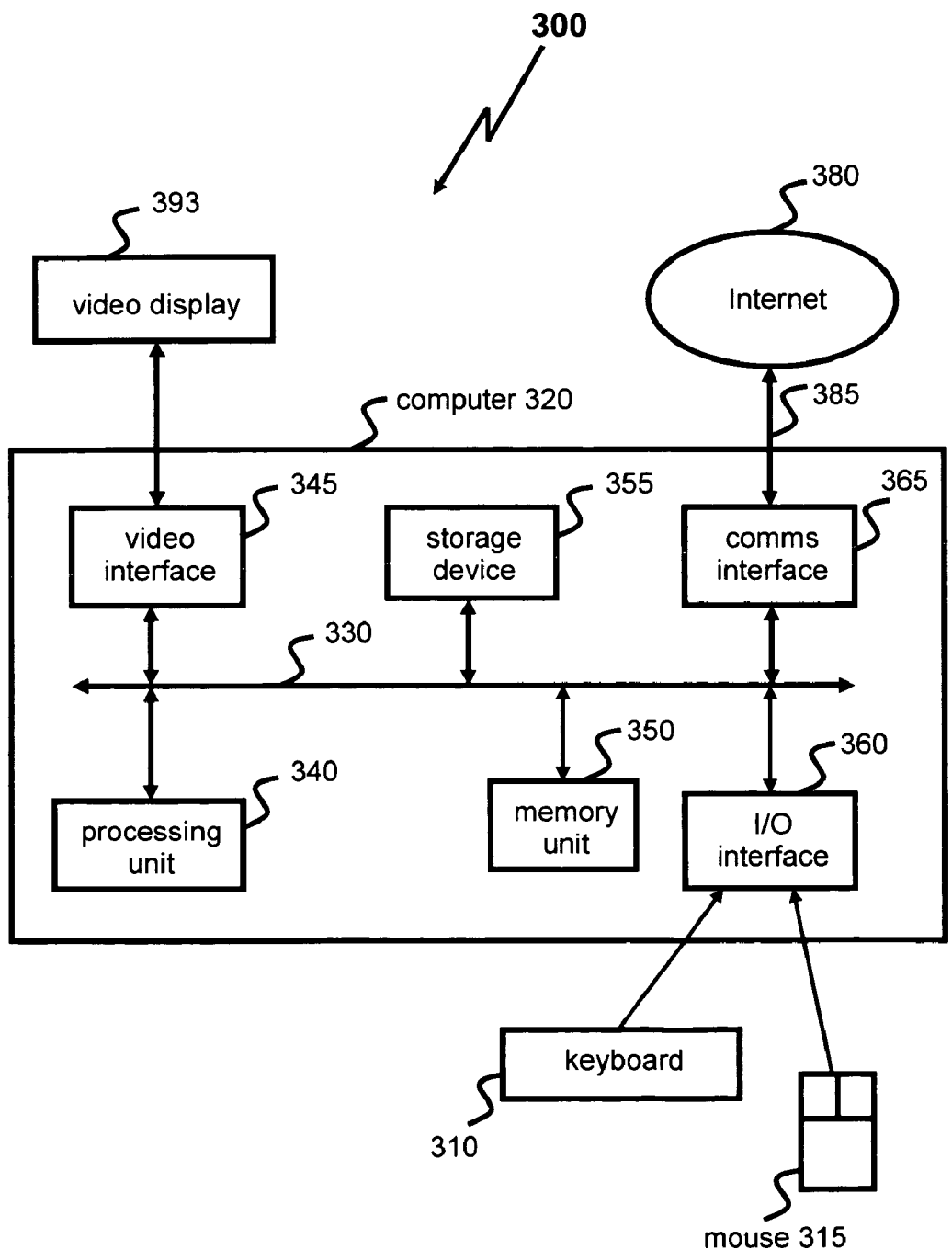
FIG. 3 is a schematic block diagram of a computer system with which embodiments of the present invention may be practised.

FIG. 3 shows a schematic block diagram of a computer system 300 that can be used to practice the methods described herein. More specifically, the computer system 300 is provided for executing computer software that is programmed to assist in performing methods for organizing semi-structured data into taxonomies. The computer software executes under an operating system such as MS Windows 2000, MS Windows XP™ or Linux™ installed on the computer system 300.

The computer software involves a set of programmed logic instructions that may be executed by the computer system 300 for instructing the computer system 300 to perform predetermined functions specified by those instructions. The computer software may be expressed or recorded in any language, code or notation that comprises a set of instructions intended to cause a compatible information processing system to perform particular functions, either directly or after conversion to another language, code or notation.

The computer software program comprises statements in a computer language. The computer program may be processed using a compiler into a binary format suitable for execution by the operating system. The computer program is programmed in a manner that involves various software components, or code, that perform particular steps of the methods described hereinbefore.

The components of the computer system 300 comprise: a computer 320, input devices 310, 315 and a video dsiplay 390. The computer 320 comprises: a processing unit 340, a memory unit 350, an input/output (I/O) interface 360, a communications interface 365, a video interface 345, and a storage device 355. The computer 320 may comprise more than one of any of the foregoing units, interfaces, and devices.

The processing unit 340 may comprise one or more processors that execute the operating system and the computer software executing under the operating system. The memory unit 350 may comprise random access memory (RAM), read-only memory (ROM), flash memory and/or any other type of memory known in the art for use under direction of the processing unit 340.

The video interface 345 is connected to the video dsiplay 390 and provides video signals for display on the video dsiplay 390. User input to operate the computer 320 is provided via the input devices 310 and 315, comprising a keyboard and a mouse, respectively. The storage device 355 may comprise a disk drive or any other suitable non-volatile storage medium.

Each of the components of the computer 320 is connected to a bus 330 that comprises data, address, and control buses, to allow the components to communicate with each other via the bus 330.

The computer system 300 may be connected to one or more other similar computers via the communications interface 365 using a communication channel 385 to a network 380, represented as the Internet.

The computer software program may be provided as a computer program product, and recorded on a portable storage medium. In this case, the computer software program is accessible by the computer system 300 from the storage device 355. Alternatively, the computer software may be accessible directly from the network 380 by the computer 320. In either case, a user can interact with the computer system 300 using the keyboard 310 and mouse 315 to operate the programmed computer software executing on the computer 320.

The computer system 300 has been described for illustrative purposes. Accordingly, the foregoing description relates to an example of a particular type of computer system such as a personal computer (PC), which is suitable for practicing the methods and computer program products described hereinbefore. Those skilled in the computer programming arts would readily appreciate that alternative configurations or types of computer systems may be used to practice the methods and computer program products described hereinbefore.

Embodiments of methods, systems and computer program products have been described hereinbefore for organizing semi-structured data into taxonomies. The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

Where specific features, elements and steps referred to herein have known equivalents in the art to which the invention relates, such known equivalents are deemed to be incorporated herein as if individually set forth. Furthermore, features, elements and steps referred to in respect of particular embodiments may optionally form part of any of the other embodiments unless stated to the contrary.

We claim:

1. A method for organizing semi-structured data into a taxonomy, based on Tag-Separated (TS) clustering, said method comprising:
    retrieving documents including said semi-structured data, said semi-structured data comprising structured data including structured data fields and tags, and unstructured data;
    selecting a structured attribute type including any of a categorical attribute, a numerical attribute, and a tag associated with annotated text, and an unstructured attribute type including a text attribute;
    clustering said semi-structured data from said retrieved documents into a plurality of clusters based on said selected structured attribute type,
        wherein for a categorical attribute, each category corresponds to a single cluster;
        wherein for a numerical attribute, a clustering algorithm clusters numerical data projected onto a range of said numerical attribute;
        wherein for an annotated text attribute, a monothetic clustering algorithm clusters annotated text data according to tags associated with a vocabulary for said annotated text data;
    and said selected unstructured attribute type,
        wherein for said text attribute, a monothetic clustering algorithm clusters text data with respect to said text attribute;
    ranking said plurality of clusters with respect to each selected structured and unstructured attribute type wherein clusters of said plurality of clusters are ranked based on a criterion comprising coverage provided by a number of data points in a cluster;
    ranking said selected structured and unstructured attribute types relative to each other based on a ranking measure, wherein said selected structured and unstructured attribute types are ranked based on entropy of corresponding data for each selected structured and unstructured attribute type; and
    outputting documents, based on said ranking measure and said ranking said plurality of clusters, as said organizing to a user.

2. The method of claim 1, further comprising representing said taxonomy as a hierarchical tree structure comprising a root node and a plurality of child nodes, said root node containing said semi-structured data and said each of said child nodes containing data points of a cluster generated front said semi-structured data.

3. A method for organizing semi-structured data into a taxonomy based on Tag-Mixed (TM) clustering, said method comprising:
    retrieving data samples including said semi-structured data, said semi-structured data comprising structured data including structured data fields and tags, and unstructured data;
    generating a vocabulary of items from said semi-structured data based on a structured attribute type including any of a categorical attribute, a numerical attribute, and a tag associated with annotated text, and an unstructured attribute type including a text attribute;
    adding all possible values of one or more structured attribute types and said unstructured attribute type to said generated vocabulary, wherein each item of said generated vocabulary comprises a set of tokens corresponding to a data sample that is part of said generated vocabulary;

initializing an inverted index for said generated vocabulary;

for each said data sample, determining said structured and unstructured attribute type and adding said set of tokens associated with each of said structured and unstructured attribute types to said inverted index;

clustering said semi-structured data by applying monothetic clustering to said items in said generated vocabulary and said data samples, corresponding to one or more tokens, of said semi-structured data that comprise said items to provide a plurality of clusters;

ranking said plurality of clusters with respect to each said structured attribute type and said unstructured attribute type, wherein clusters of said plurality of clusters are ranked based on a criterion comprising coverage provided by a number of data points in a cluster; and outputting data samples, based on said monothetic clustering of said items and said data samples, as said organizing to a user.

4. The method of claim 3, wherein for each numerical attribute:

clustering said semi-structured data based on said numerical attribute; and treating said numerical attribute based cluster as a categorical attribute; and adding all possible values of each of said plurality of numerical attributes to said vocabulary.

5. The method of claim 3, wherein said generating a vocabulary of items comprises:

for each categorical attribute, adding attribute value pairs corresponding to all possible values of the categorical attribute to the vocabulary;

for each numerical attribute, clustering the data based on the numerical attribute, considering the numerical-attribute-based clusters as categorical attributes and adding corresponding attribute value pairs to the vocabulary;

for each textual attribute, extracting alt possible words or phrases occurring in the values of the textual attribute and adding corresponding attribute word or phrase pairs to the vocabulary; and for each annotated textual attribute, adding all possible attribute tagged text tuplets to the vocabulary.

6. The method of claim 3, wherein said clustering is performed using a monothetic clustering algorithm based on each of said attribute types.

7. The method of claim 3, further comprising representing said taxonomy as a hierarchical tree structure comprising a root node and a plurality of child nodes, said root node containing said semi-structured data and each of said child nodes containing data points of a cluster generated from said semi-structured data.

8. A program storage device readable by machine, tangibly embodying a program of instructions executable by said machine to perform a method for organizing semi-structured data into a taxonomy, based on Tag-Mixed (TM) clustering, said method comprising:

retrieving documents including said semi-structured data, said semi-structured data comprising structured data including structured data fields and tags, and unstructured data;

selecting a structured attribute type including any of a categorical attribute, a numerical attribute, and a tag associated with annotated text, and an unstructured attribute type including a text attribute;

clustering said semi-structured data from said retrieved documents into a plurality of clusters based on said selected structured attribute type, wherein for a categorical attribute, each category corresponds to a single cluster;

wherein for a numerical attribute, a clustering algorithm clusters numerical data projected onto a range of said numerical attribute;

wherein for an annotated text attribute, a monothetic clustering algorithm clusters annotated text data according to tags associated with a vocabulary for said annotated text data;

and said selected unstructured attribute type, wherein for said text attribute, a monothetic clustering algorithm clusters text data with respect to said text attribute;

ranking said plurality of clusters with respect to each selected structured and unstructured attribute type, wherein clusters of said plurality of clusters are ranked based on a criterion coverage provided by a number of data points in a cluster;

ranking said selected structured and unstructured attribute types relative to each other based on a ranking measure, wherein said selected structured and unstructured attribute types are ranked based on entropy of corresponding data for each selected structured and unstructured attribute type; and outputting documents, based on said ranking measure and said ranking said plurality of clusters, as said organizing to a user.

9. A program storage device readable by machine, tangibly embodying a program of instructions executable by said machine to perform a method for organizing semi-structured data into a taxonomy, based on Tag-Separated (TS) clustering, said method comprising:

retrieving data samples including said semi-structured data, said semi-structured data comprising structured data including structured data fields and tags, and unstructured data;

generating a vocabulary of items from said semi-structured data based on a structured attribute type including any of a categorical attribute, a numerical attribute, and a tag associated with annotated text, and unstructured attribute type including a text attribute;

adding all possible values of one or more structured attribute types and said unstructured attribute type to said generated vocabulary, wherein each item of said generated vocabulary comprises a set of tokens corresponding to a data sample that is part of said generated vocabulary;

initializing an inverted index for said generated vocabulary;

for each said data sample, determining said structured and unstructured attribute type and adding said set of tokens associated with each of said structured and unstructured attribute types to said inverted index;

clustering said semi-structured data by applying monothetic clustering to said items in said generated vocabulary and said data samples, corresponding to one or more tokens, of said semi-structured data that comprise said items to provide a plurality of clusters;

ranking said plurality of clusters with respect to each said structured attribute type and said unstructured attribute type, wherein clusters of said plurality of clusters are ranked based on a criterion comprising coverage provided by a number of data points in a cluster; and outputting data samples, based on said monothetic clustering of said items and said data samples, as said organizing to a user.

10. The computer program product of claim 9, wherein for each numerical attribute:

clustering said semi-structured data based on said numerical attribute; and treating said numerical attribute based cluster as a categorical attribute; and adding all possible values of each of said plurality of numerical attributes to said vocabulary.

11. The method of claim 1, wherein said monothetic clustering algorithm generates single level labeled clusters within each attribute, assign documents to a cluster based on a single feature, identify a set of concepts present in each of a collection of documents, wherein said concepts comprise words that appear in said documents and phrases extracted from said documents by natural language processing, and select subsets of said concepts, wherein said subsets are labels of said clusters, and assign documents containing a concept to a cluster comprising said concept as its label.

12. The method of claim 3, wherein said monothetic clustering algorithm generates single level labeled clusters within each attribute, assign documents to a cluster based on a single feature, identify a set of concepts present in each of a collection of documents, wherein said concepts comprise words that appear in said documents and phrases extracted from said documents by natural language processing, and select subsets of said concepts, wherein said subsets are labels of said clusters, and assign documents containing a concept to a cluster comprising said concept as its label.

* * * * *